2,794,011
PROCESS OF SHORTSTOPPING POLYOLEFINIC COMPOUNDS USING ALKALI METAL TRI-THIOCARBONATE

Adolph J. Beber, Copley, Ohio, assignor to The General Tire & Rubber Company, Akron, Ohio, a corporation of Ohio No Drawing. Application October 8, 1953,
Serial No. 385,035

12 Claims. (Cl. 260—45.7)

This invention relates to the process of preventing further polymerization of polymeric organic compounds and particularly the preventing of undesired continued polymerization of polymers of diolefinic compounds such as the various synthetic rubbers after the desired state of polymerization has been reached.

In the preparation of organic compounds the monomeric materials are subjected to free radical initiators to cause them to build themselves into polymers of high molecular weight.

In many cases, it is desirable that polymer be stabilized against further change in characteristics. Unfortunately certain polymeric materials and particularly the solid polymeric diolefinic compounds which have substantial residual unsaturation tend to continue to polymerize after the desired polymer has been formed. The result is a hardening of the polymer and an increase in the amount of insoluble material or gel in the polymer.

In order to prevent the continued polymerization after the desired polymeric state has been obtained, it has been the customary practice to add to the latex of the polymeric material or to otherwise incorporate in the polymeric material an agent generally designated in the art as a "shortstop" which will inhibit further polymerization in the polymeric materials. Many so-called shortstops have been developed which were suitable for the "shortstopping" of rubbery materials polymerizable by the so-called "hot recipes"; i. e. those recipes which were highly active only at temperatures well above room temperatures. With the advent of the superior rubbers polymerized at temperatures well below room temperatures and generally at 50° F. or below, free radical initiator and activator systems were developed which were ineffectively shortstopped by the agents used for shortstopping the polymerization produced at elevated temperatures. Entirely new shortstopping agents, therefore, were required.

One of the earliest of these materials found to be effective was dimethylchlorobenzene. This material is troublesome because of its corrosive nature and causes severe dermatitis when it contacts the skin. It was subsequently found that certain of the dimethyldithiocarbamates such as the sodium and potassium dimethyldithiocarbamates were effective shortstops for cold rubber.

It is an object of the present invention to produce shortstopping agents which are effective for the prevention of polymerization of olefinic compounds beyond the desired state and which may be produced at less expense and with less difficulty than the alkali metal dimethyldithiocarbamates.

It is another object of the present invention to provide a process of shortstopping olefinic compounds to prevent the polymerization thereof beyond the desired state wherein a shortstopping agent, which is less expensive than shortstopping heretofore available and which is effective in relatively small amounts, is suitably incorporated into the polymeric material.

The above and other objects which will be apparent from the following description of the invention are obtained by incorporating into the mixture of polymeric material a relatively small amount of an alkali metal trithiocarbonate such as sodium, potassium, lithium or ammonium trithiocarbonate.

I have found that the trithiocarbonates and particularly the alkali metal trithiocarbonates are at least as effective as the dithiocarbonates heretofore used in "shortstopping" the polymerization of olefinic (including diolefinic compounds) beyond the desired state. The alkali metal trithiocarbonates are more easily prepared and hence have the advantage of lower cost than the carbamates. We have found no evidence of dermatitis from the use of these compounds. When the materials are polymerized in the form of aqueous emulsion or dispersion as are the general purpose synthetic rubbers, they are preferably added to the latex immediately after the desired polymerization has occurred. The shortstopping agent may, however, be incorporated as a dry powder or as a slurry or as a solution into the polymeric material by any other method as by rolling on suitable mills or by means of a suitable mixer.

The alkali metal trithiocarbonates are effective shortstopping agents in extremely low percentages. I have found that as little as .05% based on the weight of the polymer of shortstopping agent greatly retards the rate of further polymerization and gel formation in polyolefinic compounds particularly the rubbery polymers of conjugated diolefinic compounds such as butadiene-1,3; isopropene; dimethyl butadiene; chloroprene; phenyl butadiene; cyanoprene; and other diolefinic compounds having double bonds in the conjugated relation and preferably having less than 7 aliphatic carbon atoms. When the amount of many shortstopping agent or agents is increased the resistance to continued polymerization is also increased. In most instances, it is desirable that the amount of shortstopping agent present be at least 0.1% of the weight of the polymeric material and that at least .05% total of at least one alkali metal trithiocarbonate be present.

It is preferred when the shortstopping is to be continued for substantial periods that the total amount of shortstopping agents present be at least 0.15 part based on the weight of the rubber. It is preferred that alkali metal trithiocarbonates be present in 0.15 alone such amount although mixtures of alkali metal trithiocarbonates with alkali metal dimethyldithiocarbamate may also be used advantageously. The upper limit of the amount of shortstopping agent incorporated in the polymer is limited only by economic considerations and generally does not exceed 2 or 3% up to 5% of the weight of the polymer.

The polymers to which the present invention is particularly applicable are the polymers of one or more diolefinic compounds of less than 7 aliphatic carbon atoms as aforementioned including the polymer and copolymer of butadiene-1,3, dimethylbutadiene, isoprene, cyanoprene, chloroprene, phenyl butadiene and the like having conjugated double bonds including the copolymers of one or more of the above diolefinic compounds with copolymerizable mono-olefinic compounds such as the various styrenes, including chlorostyrene, methylstyrenes, 3,4 dichloroalphamethylstyrene as well as methylisopropenyl ketone, acrylic and methacrylic acids, amides, nitriles and esters such as methylacrylate, methylmethacrylate, ethylmethacrylate, acrylo and methacrylo nitriles, and corresponding amides as well as other olefinic compounds copolymerizable with butadiene. The amount of diolefinic compounds in said polymers may be from about 1 or 2% to 100% and is usually at least 15% and in most rubbers at least 50% of the weight of the polymer.

The particular free radical type systems used in effecting polymerization is in accordance with the result of my experimental work, immaterial as the agents of the present invention are shortstops for the polymers produced by the various types of free radical activated polymerization systems of which I am aware. When, however, excessive amounts of free radical initiators are incorporated in the polymerization systems it is frequently desirable to add somewhat more of the shortstopping agent. Thus the present invention is effective in shortstopping polymerization systems initiated by the combination of a peroxide or a hydroperoxide such as cumene hydroperoxide, diisopropylbenzene hydroperoxide, sodium persulfate, benzoyl peroxide, etc., with or without an amine such as triethylenetetramine and small amount of heavy metal salts such as versene (Fe-3) or a cobaltic salt as well as a system initiated or catalyzed by peroxide in combination with sugars, sodium bisulfide or other reducing agent with or without a metal capable of existing in 2 valence states. Such systems are well known in the art and form no part of the present invention. The present invention is however, particularly effective in those polymerizations wherein the polymer is produced in aqueous emulsion.

The following examples in which parts are by weight illustrate the present invention.

EXAMPLE I

A batch of butadiene-1,3 and styrene was polymerized at 41° F. in accordance with each of the following recipes:

Triton R-100 is a sodium salt of a complex, condensed organic acid. Versene Fe-3 is an organic complexing agent designed to form complex compound of hard-water salts, and divalent- and trivalent metals, including iron, in the normal pH range of 3 to 12.5. It is widely used to form complex ions of harmful metals. Sulfole is a tert-dodecyl mercaptan; polymerization modifier obtained from Phillips Petroleum Company. Dresinate 214 is a potassium soap of disproportioned rosin obtained from Hercules Powder Company.

The increment addition in the polyamine recipe was made after about 10% conversion. The polymerization was allowed to progress sufficiently to convert approximately 60% of polymerizable monomers to the solid state. Each of the batches (A) and (B) of latices thus obtained were divided into several sub-batches. The batches from batch A being subdesignated as batch A1, A2, A3, A4, A5, A6, etc., and batch B being designated as B1, B2, B3, etc. The batches thus obtained were shortstopped at the end of the polymerization by the addition of the amounts and kind of shortstop indicated in the following table. They were then again incorporated into the polymerizer and subjected to further agitation. The total solids present were measured 4 hours later and 12 hours later. After 12 hours the various latices were coagulated and the Mooney viscosity (ML-4) and percentage of gel measured in each of the samples. The results are shown in the following table:

TABLE I

| Batch | Parts of Shortstop (per 100 of polymer) | Shortstop Solids, percent | Solids after 4 hrs., percent | Solids after 12 hrs., percent | Solids Change, percent | ML-4' | Percent Gel | S. I. | ($\eta$) |
|---|---|---|---|---|---|---|---|---|---|
| A1 | 0.10 TTC | 22.4 | 22.8 | 21.7 | −0.7 | 47 | 0 | 0 | 1.80 |
| A2 | 0.20 TTC | 22.3 | 21.8 | 21.3 | −1.0 | 42 | 0 | 0 | 1.72 |
| A3 | 0.30 TTC | 22.0 | 22.5 | 21.5 | −0.5 | 49 | 0 | 0 | 1.85 |
| A4 | 0.50 TTC | 22.4 | 22.2 | 22.0 | −0.5 | 57 | 0 | 0 | 2.20 |
| A5 | 0.20 SDTC | 23.0 | 23.0 | 22.9 | −0.1 | 52 | 0 | 0 | 2.01 |
| A6 | None | 23.9 | 30.7 | 34.4 | 10.5 | 130 | 66 | 55 | 1.05 |

| Batch | Parts of Shortstop (per 100 of polymer) | Shortstop Solids, percent | Percent T. S. after 4 hrs., 41° F. | Percent T. S. after 8 more hrs., 122° F. | Solids Change, percent | ML-4' | Percent Gel | S. I. | ($\eta$) |
|---|---|---|---|---|---|---|---|---|---|
| B1 | 0.15 TTC | 20.4 | ---- | 20.7 | 0.3 | 102 | 0 | 0 | 3.02 |
| B2 | 0.30 TTC | 21.1 | 20.4 | 20.7 | −0.4 | ¹90 | 0 | 0 | 3.02 |
| B3 | 0.15 SDTC | 21.4 | 20.9 | 20.5 | −0.9 | ¹81 | 0 | 0 | 2.92 |
| B4 | 0.15 DNCB | 21.3 | 21.2 | 21.3 | 0 | ¹76 | 0 | 0 | 2.74 |
| B5 | 0.30 DNCB | 21.6 | 21.2 | 21.2 | −0.4 | ¹71 | 0 | 0 | 2.87 |
| B6 | 0.20 HQ | 21.5 | 22.3 | 20.9 | −0.6 | ¹72 | 0 | 0 | 2.87 |
| B7 | No shortstop | 20.9 | 31.1 | 32.5 | 11.5 | ¹160 | 78 | 14 | 1.07 |

¹ Tore on Mooney rotor.
TTC=Sodium trithiocarbonate.
SDTC=Sodium dimethyldithiocarbamates.
DNCB=Dinitrochlorobenzene.
HQ=Hydroquinone.

*41° F. Recipes*

|  | Batch A, Iron-pyrophosphate | Batch B, Polyamine |
|---|---|---|
|  | *Parts* | *Parts* |
| Butadiene | 72.0 | 72.0 |
| Styrene | 28.0 | 28.0 |
| Dresinate 214 | 2.93 | 2.93 |
| K-ORR Soap | 1.57 | 1.57 |
| Na₃PO₄·12H₂O | 0.5 | 0.5 |
| Triton R-100 | 0.1 | 0.1 |
| Sulfole B-8 | 0.18 | 0.18 |
| Water | 180.0 | 180.0 |
| Cumene hydroperoxide | 0.15 | 0 |
| Diisopropylbenzene hydroperoxide | 0 | 0.11 |
| Versene Fe-3 | 0 | 0.015 |
| Triethylene tetramine | 0 | 0.07 |
| Sodium Sulfite | 0 | 0.35 |
| K₄P₂O₇ | 0.27 | 0 |
| FeSO₄·7H₂O | 0.25 | 0 |
| K₂SO₃ | 0.08 | 0 |
| Diisopropylbenzene hydroperoxide (as increment) | 0 | 0.064 |
| Triethylene tetramine (as increment) | 0 | 0.04 |

It will be seen from the above table that the sodium trithiocarbonate is very effective in the prevention of gel and also in preventing increase in solids. The negative values for increase in solids are within the scope of experimental error.

EXAMPLE II

A polymer was prepared at 122° F. using the following polymerization recipe:

*122° F. Recipes*

|  | Parts |
|---|---|
| Butadiene | 72.0 |
| Styrene | 28.0 |
| Na-ORR Soap | 5.0 |
| Sulfole B-8 | 0.25 |
| Water | 180.0 |
| K₂S₂O₃ | 0.3 |

The latex thus obtained was allowed to polymerize to about 60% conversion as in the previous example and thereupon the shorstops indicated in the following table were added. Solids were measured 4 hours and 12 hours after the addition of shortstops to batches of the latex thus prepared as in the previous example. The results are shown in the following Table II:

TABLE II

| Parts of Shortstop | Percent Solids Time of Shortstopping | Percent T.S. after 4 hrs. | Percent T.S. after 8 more hrs. | Solids Change, Percent | ML-4' | Percent Gel | S.I. | (η) |
|---|---|---|---|---|---|---|---|---|
| 0.2 TTC | 20.4 | 20.8 | 20.4 | 0 | 43 | 0 | 0 | 2.00 |
| 0.5 TTC | 19.9 | 20.0 | 20.5 | 0.6 | [1]42 | 0 | 0 | 2.12 |
| 0.8 TTC | 18.3 | 18.4 | 17.9 | −0.4 | 38 | 0 | 0 | 2.20 |
| 0.5 SDTC | 19.3 | 19.3 | 19.3 | 0 | [1]32 | 0 | 0 | 1.87 |
| 0.2 HQ | 19.4 | 19.4 | 18.6 | −0.8 | 48 | 0 | 0 | 2.04 |
| None | 20.2 | 24.6 | 28.6 | 8.4 | [1]108 | 42 | 81 | 0.96 |

[1] Tore on Mooney rotor.
TTC=Sodium trithiocarbonate.
SDTC=Sodium dimethyldithiocarbamates.
HQ=Hydroquinone.

It will be seen from the above table that sodium trithiocarbonate is just as effective as are the other shortstopping agents at elevated temperatures.

In the above examples other alkali metal trithiocarbonates including ammonium trithiocarbonates, potassium trithiocarbonates and lithium trithiocarbonates may be substituted for all or part of the sodium trithiocarbonate used. The alkali metal trithiocarbonates may also be used in combination with other shortstopping agents such as hydroquinone and the alkali metal dimethyldithiocarbonates to give excellent results as aforementioned.

The effect of the trithiocarbonate remains in the polymer for a substantial period of time so that the further polymerization of the polymer is prevented even for substantial periods after the manufacture of articles from the polymer.

While the present invention is primarily directed to the preparation of rubbery polymers or polymers comprising a diolefinic compound such as a conjugated diolefine and which are characterized by being vulcanizable it is also applicable to the preparation of other unsaturated polymers.

It is to be understood that in accordance with the provisions of the patent statutes variations and modifications of the specific invention herein shown and described may be made without departing from the spirit of the invention.

What I claim is:

1. A method of inhibiting further polymerization of polymers of diolefinic compounds which comprises distributing into the said polymer of a diolefinic compound .05% to 5% based on the weight of said polymer of an alkali metal trithiocarbonate.

2. A process according to claim 1 wherein the said trithiocarbonate is incorporated into an aqueous dispersion of said polymer and the mixture thus formed is coagulated.

3. A process of claim 2 wherein the alkali metal trithiocarbonate is sodium trithiocarbonate.

4. A process according to claim 1 wherein the amount of alkali metal trithiocarbonate present is .05 to 5% of the weight of the polymer.

5. The process of claim 1 wherein the polymer of a diolefinic compound contains at least 1% by weight of the residue from the polymerization of a conjugated diolefinic compound of less than 7 aliphatic carbon atoms.

6. The process for reducing the tendency toward further polymerization of a copolymer of a diolefinic compound of less than 7 aliphatic carbon atoms with a monoolefinic compound copolymerizable therewith which comprises incorporating in said polymer .05% to 5% of an alkali metal trithiocarbonate.

7. A process according to the preceding claim wherein the said copolymer is a polymer of butadiene-1,3 and a styrene.

8. A process according to claim 6 wherein the alkali metal trithiocarbonate is a sodium trithiocarbonate and wherein the polymer is a rubbery polymer of butadiene-1,3.

9. A polymer of a diolefinic compound comprising .05% to about 3% of alkali metal trithiocarbonate.

10. A rubbery polymer of a diolefinic compound comprising at least 50% of said diolefinic compound having .05% to about 5% by weight of an alkali metal trithiocarbonate mixed therewith.

11. A process according to claim 6 wherein the said copolymer is a polymer of butadiene-1,3 and an acrylonitrile.

12. A process according to claim 6 wherein the said copolymer is a polymer of butadiene-1,3 and methylisopropenyl ketone.

No references cited.